United States Patent
Lagarde et al.

(10) Patent No.: US 8,853,973 B2
(45) Date of Patent: Oct. 7, 2014

(54) METHODS FOR CONFIGURING AND CONTROLLING A GROUP OF SCREENS, AND ACTUATOR SUITABLE FOR SUCH A CONTROL METHOD

(75) Inventors: Eric Lagarde, Sallanches (FR); Frederic Maraval, Passy (FR)

(73) Assignee: Somfy SAS, Cluses (FR)

( * ) Notice: Subject to any disclaimer, the term of this patent is extended or adjusted under 35 U.S.C. 154(b) by 0 days.

(21) Appl. No.: 14/236,704

(22) PCT Filed: Aug. 3, 2012

(86) PCT No.: PCT/EP2012/065228
§ 371 (c)(1),
(2), (4) Date: Feb. 3, 2014

(87) PCT Pub. No.: WO2013/020908
PCT Pub. Date: Feb. 14, 2013

(65) Prior Publication Data
US 2014/0166212 A1     Jun. 19, 2014

(30) Foreign Application Priority Data
Aug. 5, 2011   (FR) ...................................... 11 57198

(51) Int. Cl.
*E06B 9/72*       (2006.01)
*G05B 19/416*  (2006.01)
*E06B 9/68*       (2006.01)
*E06B 9/40*       (2006.01)

(52) U.S. Cl.
CPC ........... *E06B 9/68* (2013.01); *E06B 2009/6809* (2013.01); *G05B 19/416* (2013.01); *E06B 9/40* (2013.01); *G05B 19/4166* (2013.01)

USPC .............................. 318/101; 318/85; 160/310

(58) Field of Classification Search
USPC ........... 318/101, 85, 264, 265, 466, 467, 468; 160/1, 7, 120, 188, 310, 405; 49/31
See application file for complete search history.

(56) References Cited

U.S. PATENT DOCUMENTS 6,100,659 A *  8/2000  Will et al. ..................... 318/466
6,283,190 B1    9/2001  Hu et al.

(Continued)

FOREIGN PATENT DOCUMENTS

EP        2 120 119        11/2009
WO      2009150345      12/2009

OTHER PUBLICATIONS

International Search Report dated Aug. 31, 2012, corresponding to PCT/EP2012/065228.

*Primary Examiner* — David Purol
(74) *Attorney, Agent, or Firm* — Young & Thompson (57) ABSTRACT

Each screen (1) of a group of screens is configured by a method in which a function is approximated, the function giving the instantaneous axial position (H(t)) of the load bar (2) thereof along an axis (Z) of translation in the form of a function having, as a variable, the instantaneous angular position (y(t)) of a winding device (4). The load bars of the screens are sequentially moved into a plurality of positions in which the load bars are aligned, and then the angular position (y(t)) of the winding device is determined. Next, the coefficients defining the approximation function of each screen are determined. The movement of the load bar of each screen is controlled by an instantaneous angular-position set value ($\theta(t)$), which is in turn predetermined from a representative profile using the one-to-one approximation function.

11 Claims, 9 Drawing Sheets

(56) References Cited

U.S. PATENT DOCUMENTS

| | | | |
|---|---|---|---|
| 6,983,783 B2 * | 1/2006 | Carmen et al. | 160/120 |
| 7,281,565 B2 * | 10/2007 | Carmen et al. | 160/310 |
| 7,599,612 B2 * | 10/2009 | Moseley et al. | 388/811 |
| 7,723,939 B2 * | 5/2010 | Carmen, Jr. | 318/466 |
| 7,839,109 B2 * | 11/2010 | Carmen et al. | 318/466 |
| 8,065,039 B2 * | 11/2011 | Mullet et al. | 700/279 |
| 8,125,165 B2 * | 2/2012 | Cieslik | 318/101 |
| 8,393,378 B2 * | 3/2013 | Geriniere et al. | 160/113 |
| 2007/0221338 A1 | 9/2007 | Meewis et al. | |
| 2008/0260363 A1 | 10/2008 | Carmen et al. | |

* cited by examiner

METHODS FOR CONFIGURING AND CONTROLLING A GROUP OF SCREENS, AND ACTUATOR SUITABLE FOR SUCH A CONTROL METHOD

FIELD OF THE INVENTION

The invention relates to a method for configuring a group of screens that each comprise a load bar, a flexible element supporting this load bar and a controlled member for winding this flexible element. Such a flexible element can be a panel of a blind or of a roller blind, as well as a strap or a cord for suspending the load bar of a venetian blind.

BACKGROUND OF THE INVENTION

In order to harmoniously move the screens of a group of screens, it is known in EP-A-2 120 119 to determine for each screen a shift parameter between two reference positions, of which one is shared by the various screens of the group. It is also known in WO-A-2009/150345 to move the end of a screen when it becomes the farthest away from a shared position to be reached for a group of screens. It is finally known in U.S. Pat. No. 7,599,612 to take the winding diameter and the thickness of a flexible panel in order to configure a roller blind. This approach requires knowing the initial winding diameter and the thickness of the panel then proceeding by taking two measurements when the load bar of a screen is at a predetermined distance from a reference position, for example one foot or two feet. It is required to successively bring the load bar into these two positions by taking measurements and validations which are delicate to implement and which take time.

It is these disadvantages that the invention intends more particularly to overcome by proposing a new method for controlling which is easier and faster to implement than those of prior art, more particularly that of U.S. Pat. No. 7,599,612.

SUMMARY OF THE INVENTION

To this effect, the invention relates to a method for configuring a group of at least two screens each comprising a load bar, a flexible element supporting the load bar and a controlled member for winding the flexible element, in order to move the load bar between a first high or low position and a second low or high position, this movement resulting from an angular movement of the winding member, characterised in that it comprises at least steps consisting in:

e1) approximating a function giving the instantaneous axial position of the load bar of a first screen of a group of screens, along an axis of translation of the load bar between its first and second positions, in the form of a first one-to-one function having for variable the instantaneous angular position of the winding member of the first screen and approximating a function giving the instantaneous axial position of the load bar of a second screen of the group of screens, along an axis of translation of the load bar between its first and second positions, in the form of a second one-to-one function having for variable the instantaneous angular position of the winding member of the second screen e2) successively bringing the load bars of the first and second screens into the various positions in each of which the load bars of the first and second screens are aligned with one another and in determining, in each position and for each screen, the angular position of the winding member, e3) determining, using the values calculated in the step, coefficients defining the one-to-one approximation function of each screen, Thanks to the invention, the one-to-one approximation functions of the different screens make it possible to model the vertical movements of the load bars and the determination of their respective coefficients, thanks to the values calculated in the step e2) makes it possible to know these functions without having to measure the diameter of a winding shaft, the thickness of a panel or of a strap or the height of the load bars in the different positions.

According to advantageous but not mandatory aspects of the invention, such a method can incorporate one or several of the following features, taken in any technically permissible combination:

During the step e2), the axial position of each load bar of a screen in its different positions is determined in relation to the axial position of the load bar of another screen, without reference to a fixed referential.

During the step e1), the one-to-one approximation function used for the first screen is a polynomial function of the second degree which is expressed in the form $$H_A(t) = f_A(\gamma(t)) = a_A \gamma(t)^2 + b_A \gamma_A(t)$$

where $H_A(t)$ is the instantaneous axial position of the load bar, $\gamma_A(t)$ is the instantaneous angular position of the winding member, t is an instant and $a_A$ and $b_A$ are two constant coefficients, while the one-to-one approximation function used for the second screen is a polynomial function of the second degree which is expressed in the form $$H_B(t) = f_B(\gamma_B(t)) = a_B \gamma_B(t)^2 + b_B \gamma_B(t)$$

where $H_B(t)$ is the instantaneous axial position of the load bar, $\gamma_B(t)$ is the instantaneous angular position of the winding member, t is an instant and $a_B$ and $b_B$ are two constant coefficients and while, during the step e2), the load bars are successively brought into a first position, a second position, a third position and a fourth position.

This method comprises steps e4) and e5) posterior to the steps e1) to e3) and consisting, for the step e4), in choosing a profile that represents the desired instantaneous axial position for the load bar of each screen during its movement between the first and second positions and, for the step e5), in calculating, for each instant, during the movement of the load bar of each screen between the first and second positions, and by using the coefficients determined in the step e3), an instantaneous set value, of the angular position of the winding member of which the image via the one-to-one function of this screen is equal to a value of the instantaneous axial position of the load bar corresponding to the profile chosen in the step e4).

It is possible, furthermore, to provide that the profile chosen during the step e4) be selected from among a set of pre-established profiles, by choosing the same profile for all of the screens or profiles that are coherent with one another.

When the first positions of the load bars are aligned together, the profile chosen in the step e4) is advantageously the same for all of the screens.

The invention further relates to a method for controlling a screen belonging to a group of screens configured thanks to the method hereinabove. According to this method of controlling, the movement of the load bar of each screen is controlled, in a step e6), between its first and second positions, at an instantaneous set value of the angular position of the winding member of this screen, with this set value being itself determined, using a profile that represents the desired instantaneous axial position for the load bar during a movement between its first and second positions, using, for each screen, the one-to-one approximation function of each screen defined by the coefficients determined in the step e3).

The invention finally relates to an electric actuator which is designed for the implementation of a method such as mentioned hereinabove within a screen that comprises a flexible element supporting a load bar, as well as a member for winding this flexible element, driven in rotation by the actuator. This actuator is characterised in that it comprises means for controlling the actuator at the instantaneous set value of the angular position of the winding shaft.

Advantageously, this actuator comprises means for calculating coefficients in the step e3) and of the instantaneous value of the set value of the angular position in the step e6).

Means can be provided for selecting the profile chosen in the step e4), from among a set of pre-established profiles.

Finally, the invention relates to a home automation installation that comprises at least one screen provided with an actuator such as mentioned hereinabove.

BRIEF DESCRIPTION OF THE DRAWINGS

The invention shall be better understood and other advantages of the latter shall appear more clearly in light of the following description of two embodiments of a method and of a screen in accordance with its principle, provided solely by way of example and made in reference to the annexed drawings wherein.

DETAILED DESCRIPTION OF THE INVENTION

Figure 1:
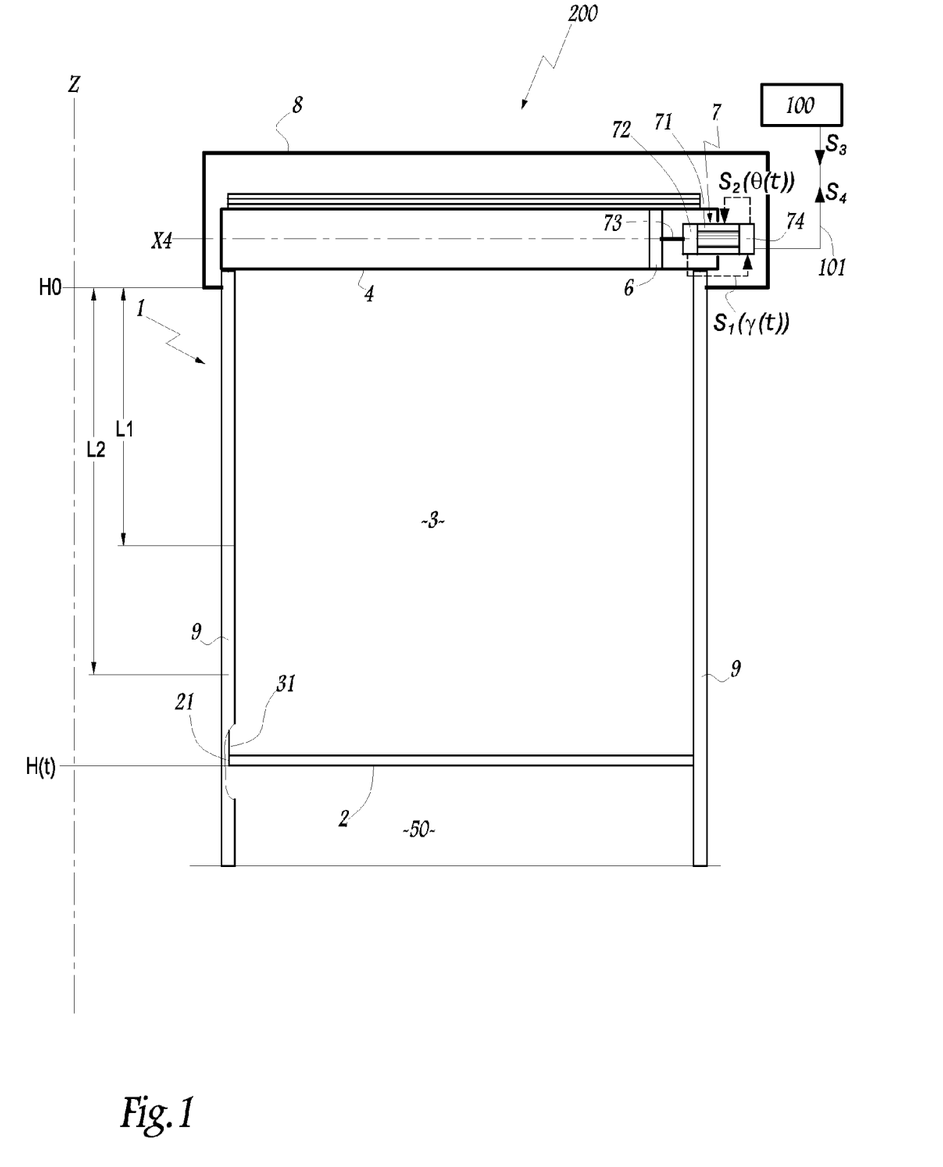
FIG. 1 is a schematic representation of a screen in accordance with the invention and provided for the implementation of a method in accordance with the invention.

The screen 1 shown in FIG. 1 is of the windable blind type and comprises a mobile portion which includes a load bar 2 mounted in the low portion of a panel 3 that can be wound around a winding tube 4 mobile in rotation around a horizontal axis X4. The panel 3 is intended to selectively obscure an opening 50 such as a window. The winding tube 4 rotates jointly with a crown 6 which is driven by an actuator 7 that comprises a direct current asynchronous electric motor 71 as well as a sensor 72 of the angular position of the output shaft 73 of the motor 71. The sensor 72 makes it possible to determine the angular position of the shaft 73 using a predetermined reference position.

As can be seen in the extracted portion of FIG. 1, the ends 21 of the load bar 2 and the lateral edges 31 of the panel 3 are engaged in two sliders 9 arranged on either side of the opening 50.

Other types of screens can be used with the invention, in particular roller blinds, venetian blinds with or without slats that can be oriented, that each support a load bar and which are provided with straps, or blinds with a flexible panel and straps, with the straps lining the panel and supporting the load bar. The straps can then be wound on drums or on a winding tube that generally extends over the entire width of the opening to be 50 to be obscured.

The central shaft of the portion whereon is wound the windable element of the panel is defined as the winding shaft of the screen 1. In the example of the figures, this winding shaft is formed by the tube 4. In the case of a venetian blind, this winding shaft can be constituted by a shaft connecting two strap winding drums or by a drive shaft for such a drum.

The sensor 72 can for example be of the inductive or optical type. It detects the actual position $\gamma(t)$ of the winding shaft defined as hereinabove, here the winding tube 4, at each instant t.

The elements 5 to 7 are arranged in a housing 8 which is mounted in the upper portion of the opening 50 to be obscured with the screen 1.

A control unit 74 is integrated into the actuator 7. The sensor 72 is electrically connected to this unit to which it provides information concerning the instantaneous actual angular position $\gamma(t)$ of the winding tube 4, in the form of a first electric signal $S_1(\gamma(t))$.

The control unit 74 controls the motor 71 by supplying the latter based on a second electric signal $S_2(\theta(t))$ developed using an instantaneous set value $\theta(t)$, calculated by a controlling system included in the unit 74, for the value of the angular position of the winding shaft. The controlling system implements a control loop which is advantageously of the PID type.

The unit 74 is connected to a control box 100 by the intermediary of a wired connection 101 whereon flows an electronic signal $S_3$ for controlling the screen 1. The box 100 is offset, i.e. arranged at a distance, in relation to the screen 1. The unit 74 emits to the box 100 a return signal $S_4$ containing information concerning the state and/or the position of the screen 1. The box 100 includes means for processing the signal $S_4$, means for calculating and means for emitting the signal $S_3$.

A vertical axis Z is considered in the vicinity of the opening 50 and of the screen 1. It is noted H(t) the position of the load bar 2 along the axis Z, with this position being measured in relation to a reference position H0 corresponding to the upper end of the opening 50, i.e. the position of the top end of travel of the load bar 2 during a raising movement of the latter.

This instantaneous axial position H(t) is directly perceived by an observer of the movements of the screen 1.

It is considered that the value of this instantaneous axial position H(t) can be expressed in the form of a polynomial function of the second degree having for variable the instantaneous angular position of the winding shaft, which corresponds to the variable $\gamma(t)$ detected by the sensor 72, as explained hereinabove.

As such, at each instant t during a movement of the load bar 2, its position along the axis Z can therefore be expressed as follows:

$$H(t)=f(\gamma(t))=a\,\gamma(t)^2+b\,\gamma(t) \quad \text{(Equation 1)}$$

where a and b are two constant coefficients, without a unit, defining the function f.

This choice of a function of approximation of the instantaneous axial position H(t) of the load bar 2 makes it possible to implement calculations that, as explained hereinafter, favour an effective controlling of the actuator 7.

In practice, the coefficients a and b depend on the nominal characteristics of the actuator 7, tolerances in manufacturing and the precision of the mounting of the screen 1 in relation to the opening 50. These two coefficients are determined by the calculation using the actual values measures in an installation 200 to which the screen 1 belongs. Such an installation is shown in FIGS. 2 to 5 and comprises two screens 1A and 1B of the type of the screen 1. The references of the elements comprising the screens 1A and 1B bear the same references as those of the screen 1 in FIG. 1, except the load bars which are respectively referenced as 2A and 2B. The offset box 100 constitutes a common control unit used to control the actuators 7 of these two screens and it is connected to the units 74 of these actuators via two wired connections 101A and 101B. A control signal $S_3$ and a return signal $S_4$ are exchanged by the box 100 with each of the units 74, on each of the connections 101A and 101B.

It is considered that the two openings 50A and 50B obscured by the screens 1A and 1B are aligned, in that their respective upper limits are located at the same height, noted as H0 through convention, and that their respective lower limits are also situated at the same height.

For each of the screens 1A and 1B, variables and coefficients are defined that are similar to those mentioned for the screen 1 of FIG. 1, by assigning to these variables and coefficients an index A or B according to the screen concerned. As such, the respective instantaneous axial positions of the load bars 2A and 2B are noted as $H_A(t)$ and $H_B(t)$. In the same way, the instantaneous position of the winding shafts of the screens 1A and 1B is noted as $\gamma_A(t)$ and $\gamma_B(t)$.

The transposition of the equation 1 for the screens 1A and 1B can then be expressed as follows:

$$H_A(t)=f_A(\gamma_A(t))a_A=\gamma_A(t)^2+b_A\,\gamma_A(t) \quad \text{(Equation 1')}$$

and $$H_B(t)=f_B(\gamma_B(t))a_B=\gamma_B(t)^2+b_B\,\gamma_B(t) \quad \text{(Equation 1'')}$$

where $a_A$, $b_A$, $a_B$ and $b_B$ are four constant coefficients, without a unit, respectively defining two polynomial functions of the second degree $f_A$ and $f_B$.

These four coefficients are determined by successively bringing the load bars 2A and 2B into four positions shown respectively in FIGS. 2 to 5.

Figure 2:
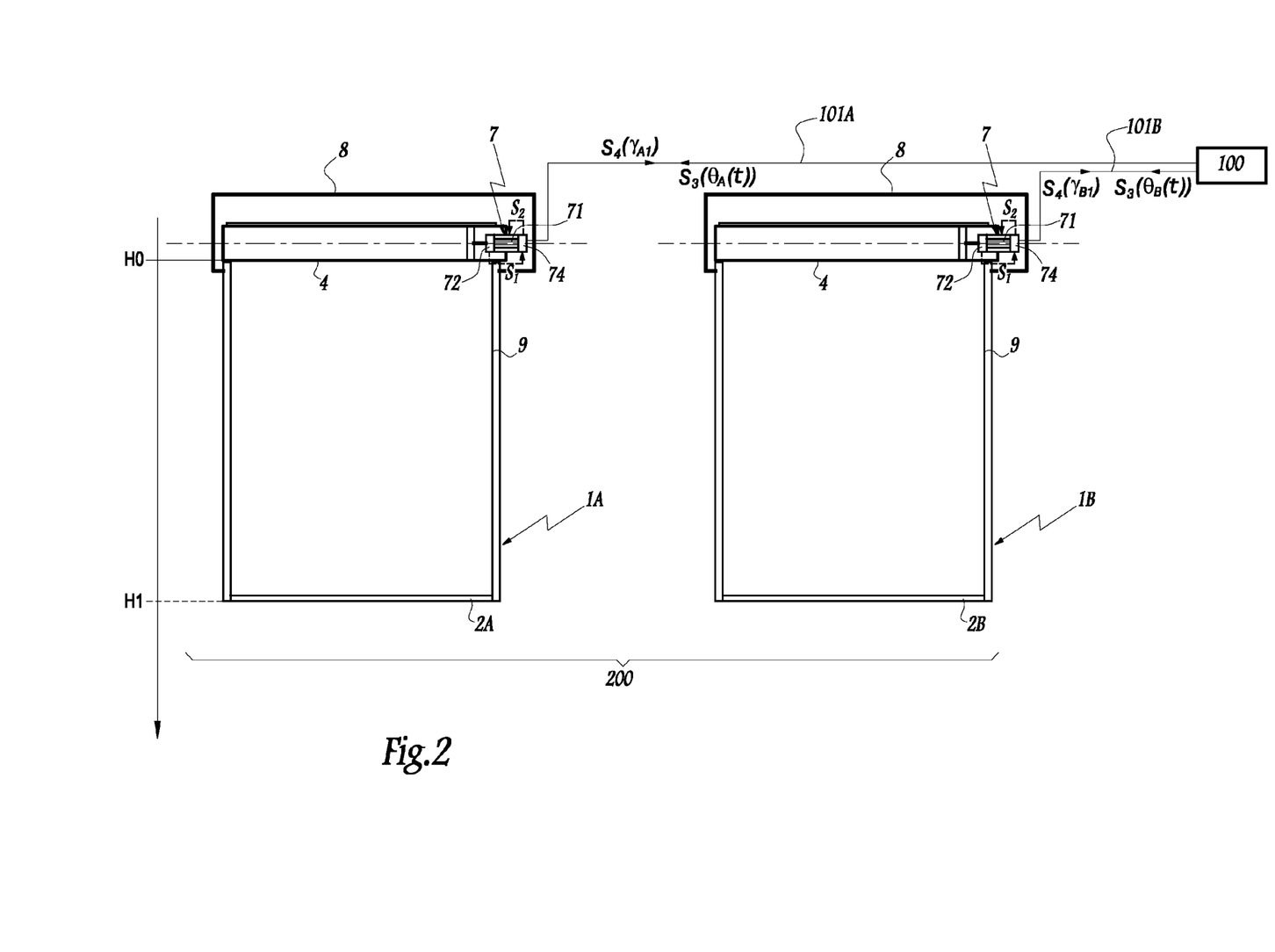
FIG. 2 is a schematic representation of an installation in accordance with the invention comprising two screens such as that of FIG. 1 controlled by a method in accordance with the invention, with these screens being in a first position.

In the first position of FIG. 2, the load bars 2A and 2B are aligned in low position in relation to the openings 50A and 50B obscured by the screens 1A and 1B. This position corresponds to a first height H1 common to the load bars 1A and 1B. In this position, it is possible to determine, thanks to the sensor 72 of the actuator 7 of the screen 1A, the actual angular position $\gamma_{A1}$ of the drums 52 of this actuator. In the same way, it is possible to determine the angular position $\gamma_{B1}$ of the drums 52 of the actuator 1B.

These values are incorporated into the signals $S_4$ sent respectively by the control units 74 of the actuators 7 of the screens 1A and 1B to the box 100.

On the other hand, independently of the exact value of the vertical distance between the heights H0 and H1, the instantaneous axial position $H_{A1}$ of the load bar 2A in the position of the FIG. 2 is equal to the instantaneous axial position HB1 of the load bar 2B. The following equation is therefore satisfied:

$$H_{A1}=H_{B1} \quad \text{(Equation 2)}$$

By using the equations 1' and 1'', it is deduced that the following relationship is satisfied:

$$a_A\gamma^2_{A1}+b_A\gamma_{A1}=a_B\gamma^2_{B1}+b_B\gamma_{B1} \quad \text{(Equation 3)}$$

Figure 3:
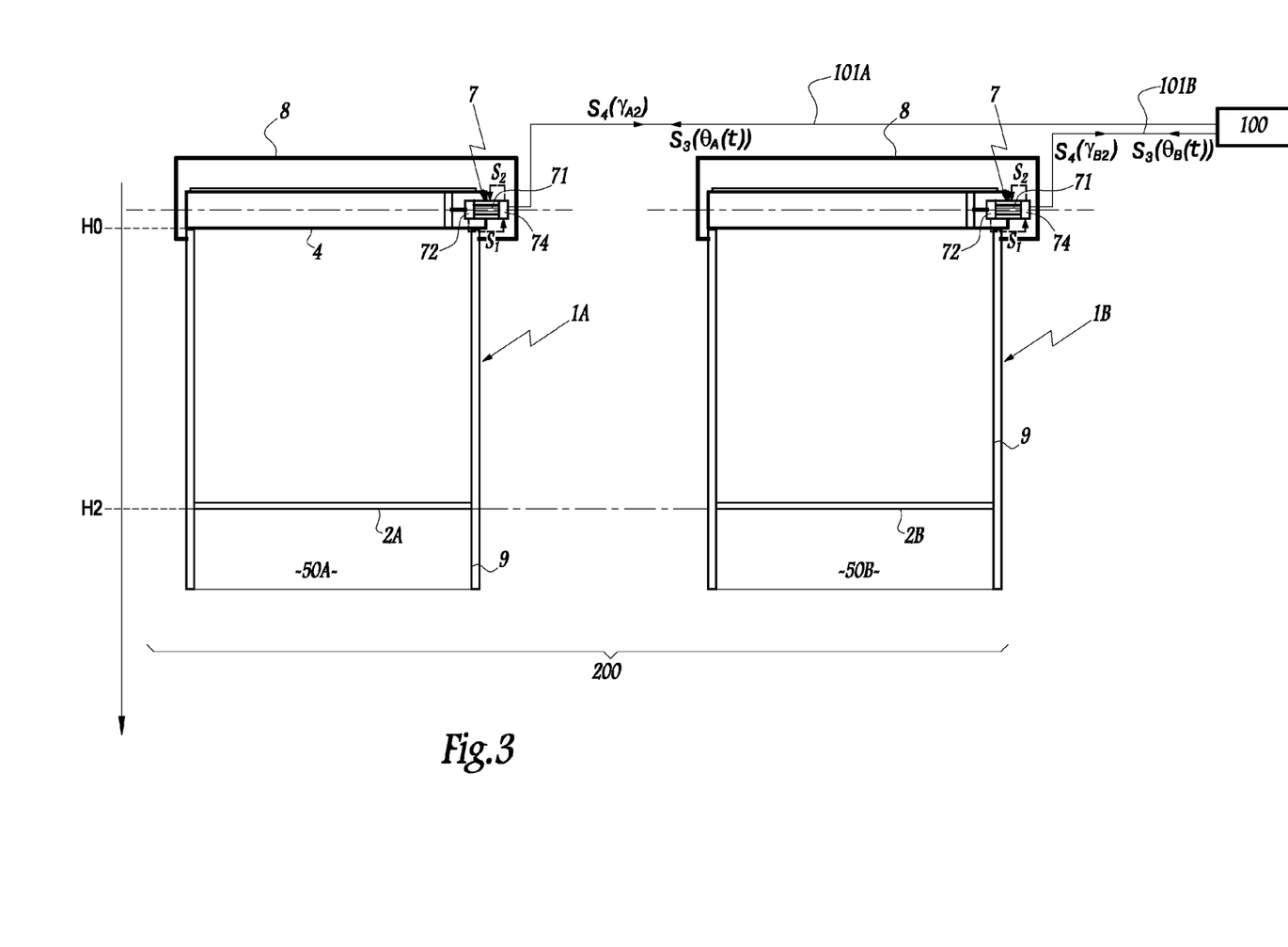
FIG. 3 is a view similar to FIG. 2, when the screens are in a second position.
Figure 4:
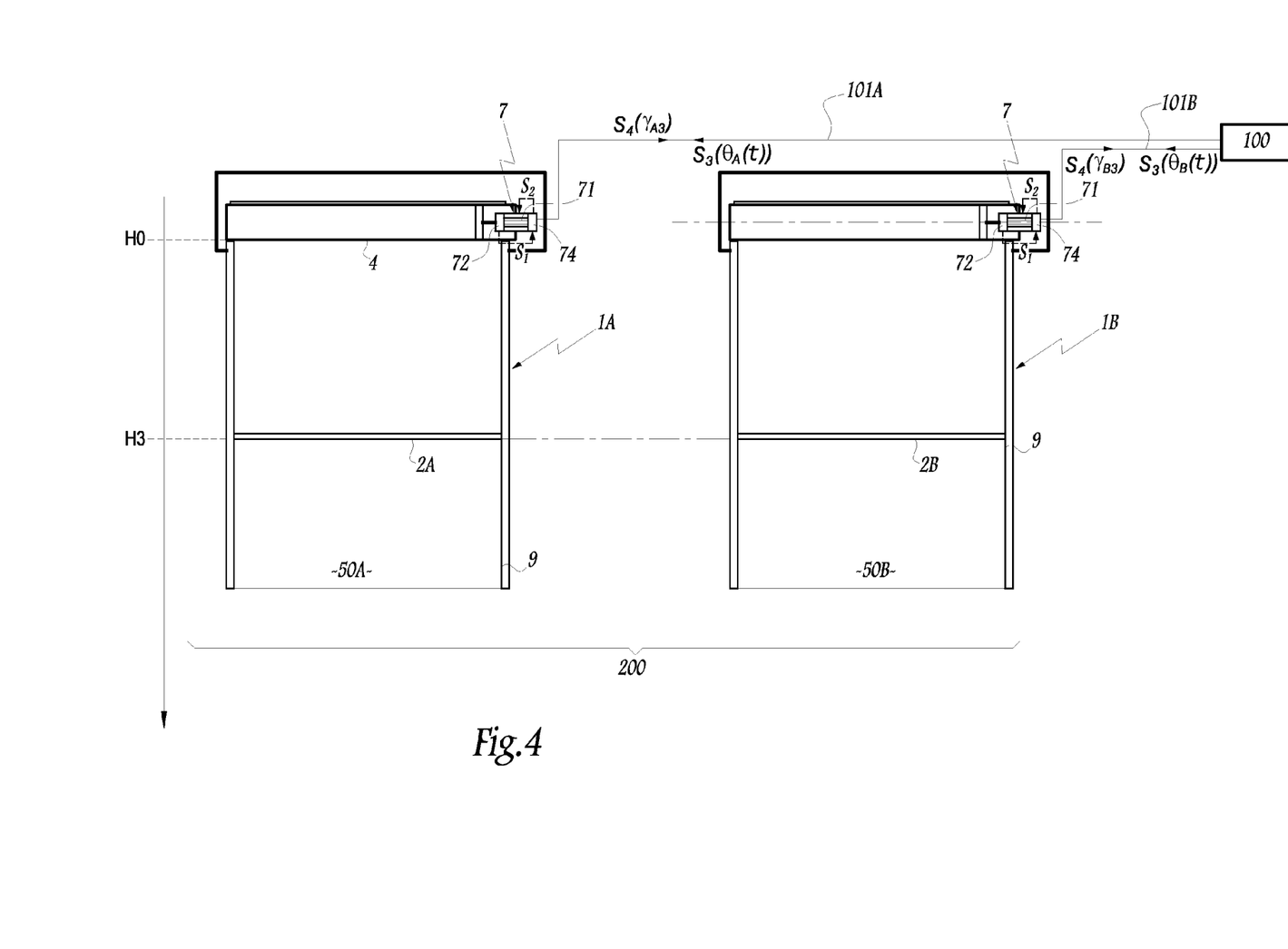
FIG. 4 is a view similar to FIG. 2 when the screens are in a third position.
Figure 5:
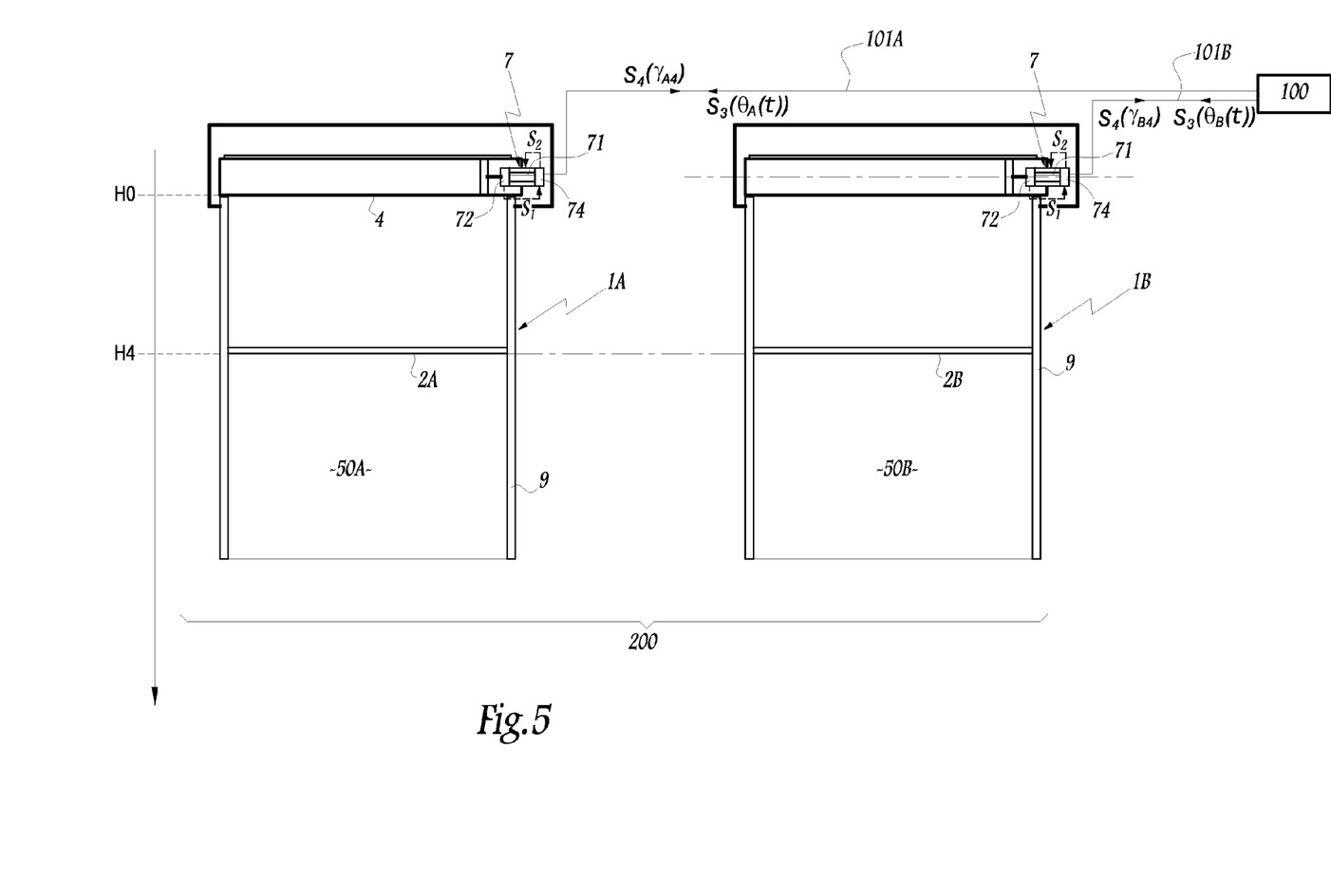
FIG. 5 is a view similar to FIG. 2 when the screens are in a fourth position.

In the same way, note $\gamma_{A2}$, $\gamma_{A3}$ and $\gamma_{A4}$ as the angular position of the drums 52 of the screen 1A in the second, third and fourth positions shown respectively in FIGS. 3 to 5 as well as $\gamma_{B2}$, $\gamma_{B3}$ and $\gamma_{B4}$ as the corresponding angular positions for the screen 1B.

By applying the same reasoning as hereinabove, it is deduced that the following relationships are satisfied:

$$a_A\gamma^2_{A2}+b_A\gamma_{A2}=a_B\gamma^2_{B2}+b_B\gamma_{B2} \quad \text{(Equation 4)}$$

$$a_A\gamma^2_{A3}+b_A\gamma_{A3}=a_B\gamma^2_{B3}+b_B\gamma_{B3} \quad \text{(Equation 5)}$$

$$a_A\gamma^2_{A4}+b_A\gamma_{A4}=a_B\gamma^2_{B4}+b_B\gamma_{B4} \quad \text{(Equation 6)}$$

The equations 3 to 6 constitute a system of equations that can be inverted by the calculation in order to express the coefficients $a_A$, $b_A$, $a_B$ and $b_B$ according to the values $\gamma_{A1}$, $\gamma_{A2}$, $\gamma_{A3}$, $\gamma_{A4}$, $\gamma_{B1}$, $\gamma_{B2}$, $\gamma_{B3}$ and $\gamma_{B4}$. This inversion can be carried out for any suitable mathematical method. Thus, the coefficients of the polynomial functions $f_A$ and $f_B$ used to approximate the instantaneous axial position of the load bars 2A and 2B can be determined without measuring the vertical distance between the positions corresponding to H1, H2, H3 and H4, on the one hand, and the reference position H0, since it is sufficient to align the two load bars 2A and 2B in order to obtain the system formed of the equations 3 to 6.

The operation of calculating the aforementioned coefficients is carried out automatically by the box 100, based on the information of angular position contained in the signals S4, received from the units 74, when the load bars 2A and 2B have been successively brought into the positions of FIGS. 2 to 5.

When these coefficients have been calculated in the box 100, they are sent by the latter to each of the units 74. More precisely, the coefficients $a_A$ and $b_A$ are sent to the unit 74 of the screen 1A, while the coefficients $a_B$ and $b_B$ are sent to the unit 74 of the screen 1B. Electric signals transiting over the connections 101A and 101B are used to do this.

It is observed that the heights H1 to H4 do not have to be chosen in a precise manner and that the method for determining coefficients mentioned hereinabove is applicable independently of the exact value of these heights. In other words, the installer that is commissioning the installation 200 does not have to precisely measure the heights H1 to H4, as long as he effectively aligns the load bars 2A and 2B in four positions that are reached successively. The installation therefore does not need to refer to an exterior fixed reference base.

Figure 6:
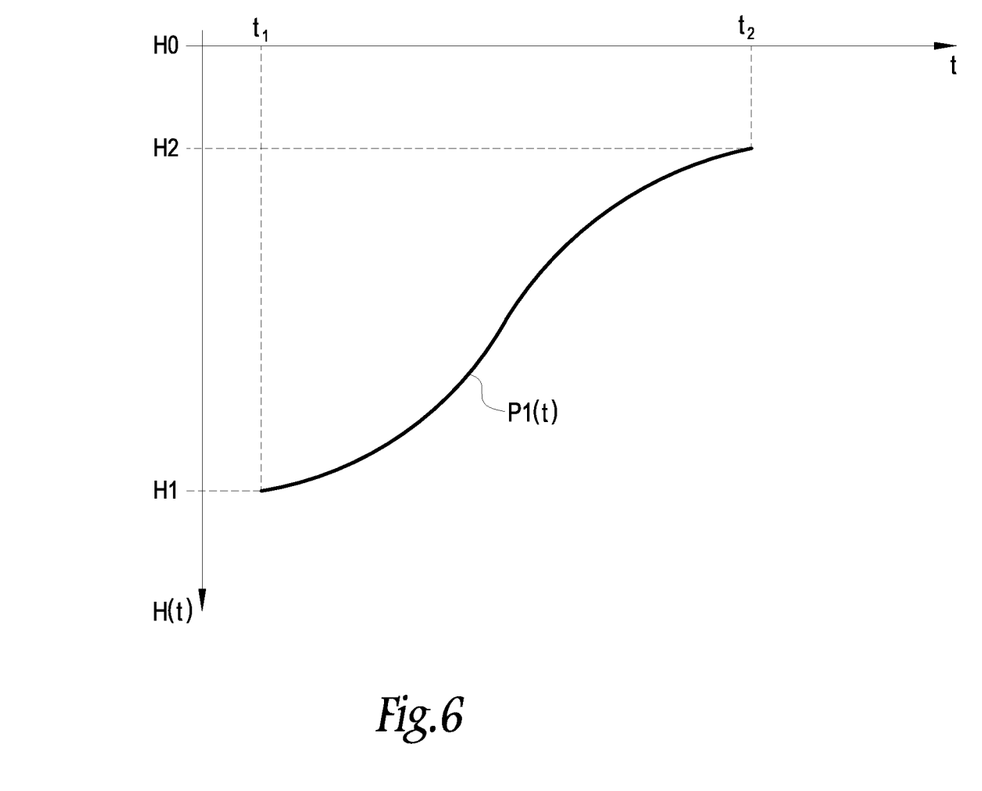
FIG. 6 is a schematic representation of a profile that represents the position in height of the load bar of one of the screens of the installation of FIGS. 2 to 5, as a function of time, during the movement of these screens between the configuration of FIG. 2 and that of FIG. 3.

Moreover, the movement profile of the load bas 2A and 2B during a raising or lowering movement is chosen in a database of profiles stored in a memory belonging to the box 100 or to each of the units 74. Each profile comprises a curve, in the form of a table or of a polynomial, of the type as that shown in FIG. 6 for the profile P1(*t*) and representative of the instantaneous axial position $H_A(t)$ or $H_B(t)$ of the load bar when the latter is moved.

Consider the case wherein the load bar 2A is displaced from the first position H1 to the second position H2, between two instants $t_1$ and $t_2$. The profile P1(*t*) shown in FIG. 1 corresponds, between the instants $t_1$ and $t_2$, to a starting with progressive acceleration, then to a progressive slowing down.

If, as considered hereinabove, the profile $P1(t)$ is chosen as having to be followed by the load bar 2A during the movement of the latter between two positions H1 and H2, then the following equation is satisfied:

$$H_A(t) = P1(t) \tag{Equation 7}$$

This equation 7 represents a set value for the instantaneous axial position $H_A(t)$ of the load bar 2A.

In order to satisfy this set value, the actuator 7 of the screen 1A is controlled thanks to a temporal set value of the position $\theta_A(t)$ of its winding shaft. In other words, the movements of the winding tube 4 and of the shaft 73 are controlled according to the set value $\theta_A(t)$.

Based on the approximation mentioned hereinabove, this set value $\theta A(t)$ must satisfy the equation 1 with regards to the profile P1. In other words, the following equation must be satisfied:

$$P1(t) = a_A \theta_A(t)^2 + b_A \theta_A(t) \tag{Equation 8}$$

This equation 8 shows that there is a transfer function between the set value of the angular position $\theta_A(t)$ and the selected profile $P1(t)$. In other words, the set position of the angular position $\theta_A(t)$ is the solution of an equation of the second degree which is expressed in the form $$a_A \theta_A(t)^2 + b_A \theta_A(t) - P1(t) = 0 \tag{Equation 9}$$

This solution can be expressed in the form:

$$\theta_A(t) = \frac{-b_A + \sqrt{b_A^2 + 4a_A P_1(t)}}{2a_A} \tag{Equation 10}$$

In other words, the temporal function $\theta_A(t)$ giving the set value used to control the actuator 7 during a movement can be expressed as a function of the coefficients $a_A$ and $b_B$ determined previously and as a function of the selected profile $P1(t)$.

In the same way, the value of the instantaneous set value $\theta_B(t)$ used for controlling the actuator 7 of the screen 1B can be expressed in the form:

$$\theta_A(t) = \frac{-b_A + \sqrt{b_B^2 + 4a_B P_1(t)}}{2a_B} \tag{Equation 11}$$

It makes it possible to control the movement of the load bar 2B, between the positions H1 and H2, as explained hereinabove for the load bar 1A.

The calculation of the instantaneous set values is carried out in a decentralised manner, in the units 74. Alternatively, this calculation can be carried out in the box 100.

It is observed that the determination of the instantaneous value of the set values of the angular position is carried out without having to measure the diameter of the winding tube 4 or the thickness of the panel 3. Likewise, in the case of a screen provided with straps, it will not be necessary to measure the thickness of these straps.

One of the objectives of the invention is that the movement of the two screens 1A and 1B is harmonious, i.e. that this movement is perceived as being synchronised or "unitary" by an observer looking at a facade wherein are arranged the two openings 50A and 50B.

To do this, each actuator 7 is controlled by its unit 74 thanks to a temporal set value of the angular position of the winding shaft.

More precisely, each actuator 7 is controlled with a law of predetermined movement of the type $\theta_A(t)$ or $\theta_B(t)$ where $\theta$ is the instantaneous angular position of the winding tube and t is an instant, as explained hereinabove.

The value $\theta_A(t)$ or $\theta_B(t)$ is used at each instant t by the unit 74 as a set value in order to control each actuator 7. It is used to generate the signal $S_2$ emitted by each unit 74 in order to supply the associated motor 71. In other words, the unit 74 controls the operation of each actuator at the value $\theta_A(t)$ or $\theta_B(t)$ for each instant t of the movement of the load bars 2A or 2B, between the positions corresponding to the heights H1 and H2.

Thus, when a movement has to be controlled starting with an instant $t_0$, for example for the screen 1A, the instantaneous movement set value $\theta_A(t)$ for each instant, starting from $t_0$, is calculated by a computer of the unit 74. This set value $\theta_A(t)$ is then used to control the actuator 7, in such a way that the actual position $\gamma_A(t)$ of the winding shaft of the screen 1A is equal to or is the most equal possible to the value $\theta_A(t)$, for each instant, with this value $\gamma_A(t)$ being detected by the sensor 72 and used as a counter-reaction value in a control loop implemented in the unit 74 of the screen 1A, thanks to the signals $S_1$ and $S_2$.

The box 100 is used to generate an activation signal emitted towards the units 74 of all the installation screens, when it is suitable to wind or unwind their panels 3. This box 100 therefore makes it possible to synchronise the movement of the screens 1A and 1B.

If, during the raising of the load bar 2A of the screen 2, the latter encounters an obstacle in the slide 9, for example the head of a screw which has become progressively loose, the load bar 2A is momentarily slowed down, when passing this obstacle. This is detected because the value of the actual angular position $\gamma_A(t)$ of the rotor then moves away from the set value $\theta_A(t)$ for at least one instant t following the encounter of the load bar 2A with the obstacle. In the sense that the actuator 7 of the screen 1A is controlled with the temporal set value $\theta_A(t)$ of the instantaneous angular position for its drums 52, the delay taken by the bar 2A in its movement between the positions H1 and H2, in relation to the bar 2B of the screen 1B, is compensated: this delay is detected by the sensor 72 which informs the unit 74 of it thanks to the signal $S_1(\gamma_A(t))$, which units acts on the motor 71 in order to temporarily accelerate its rotation and again align the actual angular position $\gamma_A(t)$ of the drums 52 on the temporal set value $\theta_A(t)$ of the angular position for the rest of the course of travel.

Preferably, the acceleration is not immediate and the instantaneous angular position $\gamma_A(t)$ of the winding shaft can remain temporarily deviated in relation to the temporal set value $\theta_A(t)$ of the angular position. Due to the controlling, and in particular to its dynamic performance, an acceleration of the winding is then generated without any sudden movements in order for the instantaneous angular position $\gamma_A(t)$ to coincide with the temporal set value $\theta_A(t)$ of the angular position.

As such, even in the case of a momentary delay of the screen 1A in relation to the screen 1B, this delay is offset, in such a way that the movement of the two screens 2A and 2B is harmonious.

This operation can be transposed to the actuator 7 of the screen 1B, by inverting the indexes A and B in what precedes.

In the example hereinabove, the positions of the top and bottom end of travel of the load bars 2A and 2B are aligned and it is possible to choose the same profile $P1(t)$ for the desired instantaneous axial position for these load bars during their respective movements. As such, if these load bars start from the same position, from the end of travel or from the same intermediate position, they will have a coordinated movement.

Figure 7:
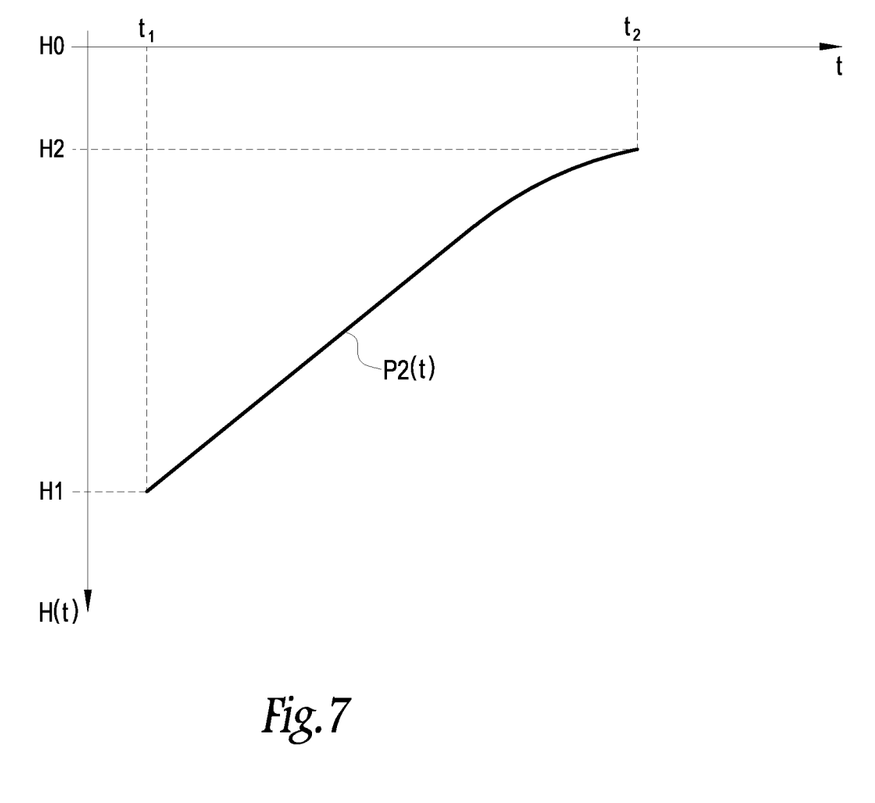
FIG. 7 is a view similar to FIG. 6 or another profile that can be used with the installation of FIGS. 2 and 3.

The profile $P1(t)$ of FIG. 4 is not the only one possible and the profile $P2(t)$ shown in FIG. 7 can also be considered. Other profiles not shown can also be used with the invention. They are stored in a memory of each unit 74 or in a memory of the box 100 and can be selected individually by the installer during the commissioning of the installation 200. In this case, means not shown, such as a programming console, make it possible to select one of the profiles.

Alternatively, a single profile, for example the profile $P1(t)$, is stored in the memory of each unit 74 or in that of the box 100. In this case, the profile used is systematically chosen as equal to this stored profile.

Figure 8:
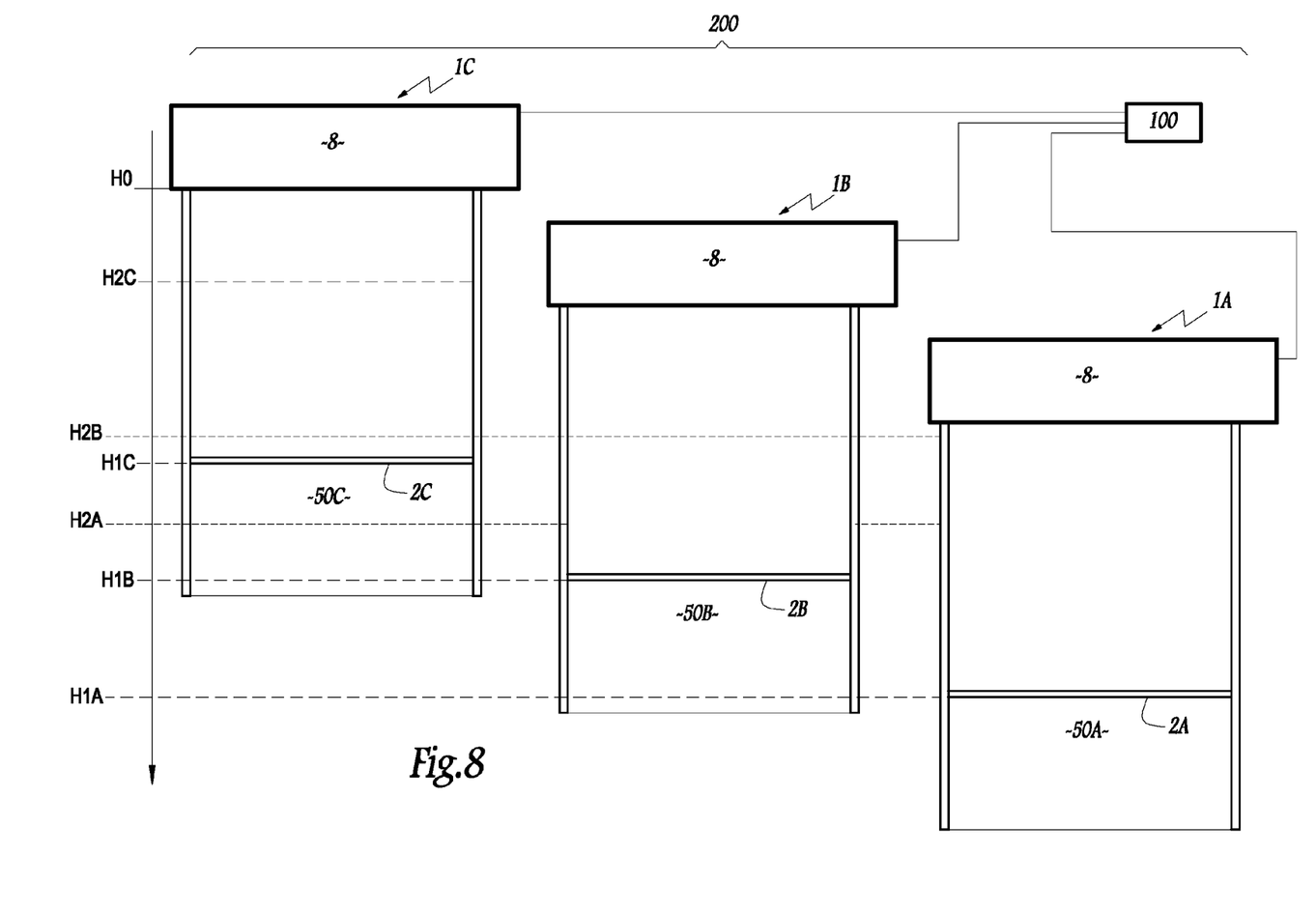
FIG. 8 is a schematic representation of a second installation in accordance with the invention comprising three screens controlled by a method in accordance with the invention and FIG. 9 shows a profile used for controlling the screens of the installation of FIG. 8.

The invention can also be used in the case of several screens arranged on openings 50A, 50B and 50C arranged at different levels in relation to one another, as shown with the installation 200 of FIG. 8 where the housings of the screens 1A, 1B and 1C are shown as an outside view. These screens are identical to the screen 1 of FIG. 1 and each further comprises an actuator and a winding shaft formed here by a winding tube, of the type of the tube 4.

In this case also, the coefficients of the polynomial functions used to express the instantaneous axial position of the load bars 2A, 2B and 2C according to the instantaneous angular positions of the corresponding winding drums can be calculated by successively aligning these load bars 2A, 2B and 2C in four positions wherein the actual instantaneous angular positions of the winding drums are raised, as explained in reference to the first embodiment.

It is observed that, even if the installation 200 of FIG. 8 comprises more than two screens, the determination of the coefficients mentioned hereinabove is carried out using four positions only, as long as four positions with the bars aligned can be defined.

It is considered that the load bar 2A of the screen 1A must pass from a position corresponding to the height H1A to the height H2A in relation to a reference height H0 corresponding to the high neutral point of the trajectory of the load bar 2C of the highest screen 1C.

In the same way, it is considered that the respective load bars 2B and 2C of the screens 1B and 1C must pass from the position H1B, respectively H1C, to the position H2B, respectively H2C.

Figure 9:
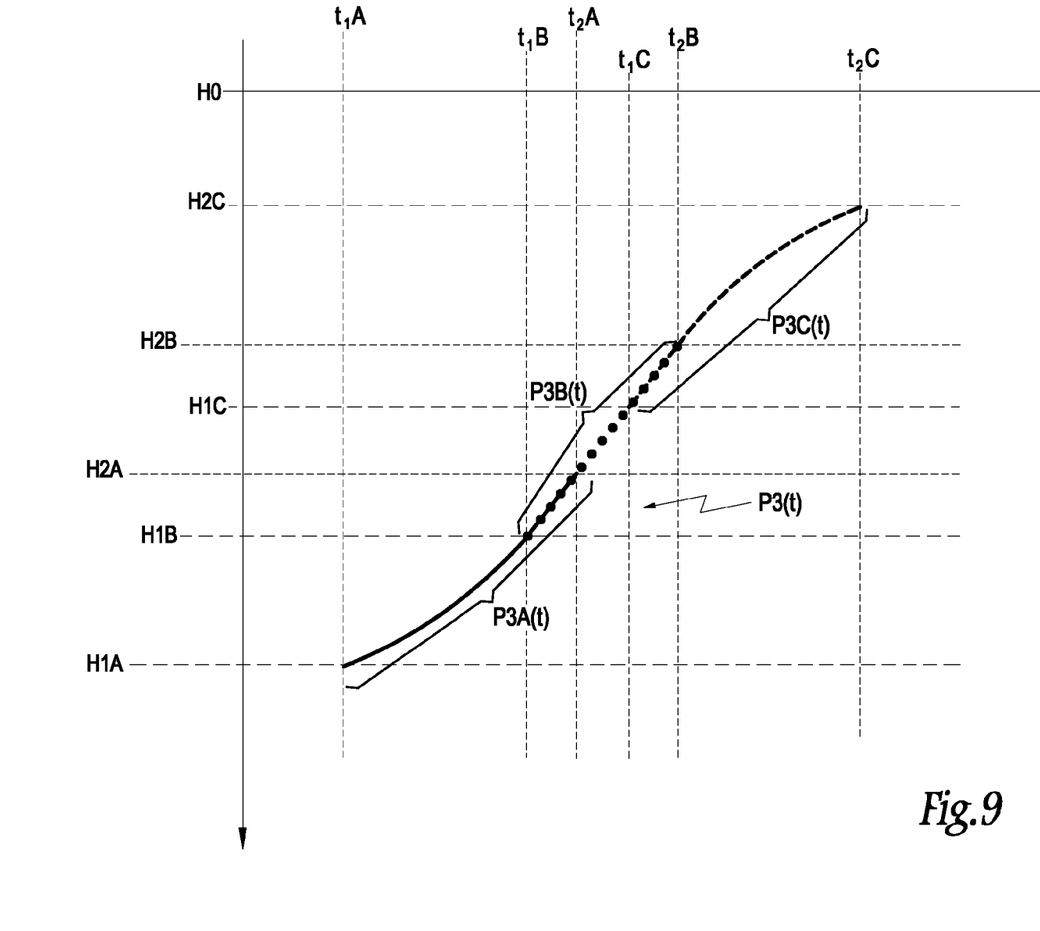

In this case, the profile $P3(t)$ used can be that shown in FIG. 9, which is composite, in that it comprises a portion P3A(t), a portion P3B(t) and a portion P3C(t) dedicated respectively to the controlling of the load bars 2A, 2B and 2C. In FIG. 7, the portion P3A(t) is shown as a solid line, the portion P3B(t) with circles and the portion P3C(t) as a dotted line. As can be seen in FIG. 9, these portions overlap.

By implementing the method of the invention, i.e. by determining coefficients similar to the coefficients $a_A$, $b_A$, $a_B$ and $b_B$ for each of the screens 1A, 1B and 1C as explained hereinabove, then by calculating instantaneous set values for each of the screens 1A, 1B and 1C, it is possible to obtain a coordinated movement according to the profile $P3(t)$ of the load bars 2A, 2B and 2C which have an apparently shared trajectory, as if a single load bar was moving successively in the openings 50A, 50B and 50C obscured by the screens 1A, 1B and 1C.

According to an alternative of the invention that can be applied to all of the embodiments, the computation of the coefficients $a_A$, $b_A$, $a_B$ and $b_B$ and the determination of the set values of the angular position $\theta_A(t)$ and $\theta_B(t)$ can be entirely or in part carried out in the units 74 of the different screens. In this case, the box 100 is used as a node for a logic network wherein the information pertaining to the angular positions $\gamma_{A1}, \gamma_{A2} \ldots \gamma_{B4}$ and equivalent flow and this information is transmitted to all of the units 74 which can then carry out these calculations.

Regardless of the embodiment, the coefficients $a_A$, $b_A$, $a_B$ and $b_B$ and equivalent are proper to each screen.

A synchronised starting of the various screens of a group of screens makes it possible to coordinate the harmonious movement of their load bars.

Regardless of the alternative, the invention is particularly interesting for controlling a set of several screens, since it makes it possible to coordinate the movement of their respective load bars, in particular thanks to the same box 100 and to the units 74 that include the means for calculating and the means for controlling the movement of each load bar between its first and second positions, for each screen, according to the temporal set value of the instantaneous angular position of the winding member of each screen.

In terms of equipment, the invention is relatively simple to implement since it is sufficient to use a sensor 72 in conjunction with a box 100 associated with units 74, with these elements being programmed in a suitable manner to calculate the coefficients $a_A$, $b_A$, $a_B$, $b_B$ and equivalents and the functions $\theta_A(t)$, $\theta_B(t)$ and equivalents then control the movement of the load bars 2 between their respective starting and ending positions, in relation to the temporal set value of the instantaneous angular position $\theta_A(t)$, $\theta_B(t)$ or equivalent of the winding drums 52.

Alternatively, the motor 71 can by of the asynchronous type.

According to another alternative, the sensor 72 can be dissociated from the electric motor 71 and mounted at the opposite end of the shaft 6, as long as it makes it possible to know the instantaneous angular position of at least one of the drums 52.

The invention is described hereinabove in the case where the one-to-one approximation function $f_A$ or $f_B$ is a polynomial function of the second degree. It can be applied in the case where this polynomial function is of a different degree, for example of the first, third or fourth degree. The invention can also be applied to the case wherein this function is not polynomial, for example logarithmic. In this case, the computation of the coefficients of the one-to-one function is adapted.

The invention has been described in the case of a raising of the load bar of a screen. It also applies in the case where this load bar is lowered, for example in the case of a wedging of the winding shaft.

The examples hereinabove concern the case wherein the screens used are screens for closing or solar protection. The invention can also be used for a projection screen, in particular for video projection. This is particularly advantageous in the case of maneuvering many screens, for the modification of the projection format.

In the installations of FIGS. 2 to 5 and 8, an offset parameter can be defined for each screen 1A, 1B and/or 1C, by applying the technical teachings of EP-B-2 120 119.

The technical features of the embodiments and alternatives considered hereinabove can be combined together.

The invention claimed is:

1. Method for configuring a group of at least two screens each comprising a load bar, a flexible element supporting the load bar and a controlled member for winding the flexible element, in order to move the load bar between a first high or low position and a second low or high position, this movement resulting from an angular movement of the winding member, wherein it comprises at least the steps consisting in:

e1) approximating a function giving the instantaneous axial position of the load bar of a first screen of the group of screens, along an axis of translation of the load bar between its first and second positions, in the form of a first one-to-one function having for variable the instantaneous angular position of the winding member of the first screen and approximating a function giving the instantaneous axial position of the load bar of a second screen of the group of screens, along an axis of translation of the load bar between its first and second positions, in the form of a second one-to-one function having for variable the instantaneous angular position of the winding member of the second screen e2) successively bringing the load bars of the first and second screens into different positions in each of which the load bars of the first and second screens are aligned with one another and determining, in each position and for each screen, the angular position of the winding member, e3) determining, using the values calculated in the step e2), coefficients defining the one-to-one approximation function of each screen.

2. Method according to claim 1, wherein, during the step e2), the axial position of each load bar of a screen in its different positions is determined in relation to the axial position of the load bar of another screen, without reference to a fixed reference base.

3. Method according to claim 1, wherein, during the step e1), the one-to-one approximation function used for the first screen is a polynomial function of the second degree which is expressed in the form $$H_A(t) = f_A(\gamma(t)) = a_A \gamma(t)^2 + b_A \gamma_A(t)$$

where $H_A(t)$ is the instantaneous axial position of the load bar, $\gamma_A(t)$ is the instantaneous angular position of the winding member, t is an instant, $a_A$ and $b_A$ are two constant coefficients, while the one-to-one approximation function used for the second screen is a polynomial function of the second degree which is expressed in the form $$H_B(t) = f_B(\gamma_B(t)) = a_B \gamma_B(t)^2 + b_B \gamma_B(t)$$

where $H_B(t)$ is the instantaneous axial position of the load bar, $\gamma_B(t)$ is the instantaneous angular position of the winding member, t is an instant, $a_B$ and $b_B$ are two constant coefficients and wherein, during the step e2), the load bars are successively brought into a first position, a second position, a third position and a fourth position.

4. Method according to claim 1, wherein it comprises the steps after the steps e1) to e3) and consisting in:

e4) choosing a profile that is representative of the desired instantaneous axial position for the load bar of each screen during its movement between the first and second positions, e5) calculating, for each instant, during the movement of the load bar of each screen between the first and second positions, and by using the coefficients determined in the step e3), an instantaneous set value of the angular position of the winding member of which the image via the one-to-one function of this screen is equal to a value of the instantaneous axial position of the load bar corresponding to the profile chosen in the step e4).

5. Method according to claim 4, wherein the profile chosen during the step e4) is selected from among a set of pre-established profiles, by choosing the same profile for all of the screens or profiles that are coherent with one another.

6. Method according to claim 4, wherein, when the first positions of the load bars are aligned between them, the profile chosen in step e4) is the same for all of the screens.

7. Method for controlling at least one screen belonging to a group of screens configured by a method according to claim 1, wherein it comprises at least one additional step consisting in:

e6) controlling the movement of the load bar of each screen, between its first and second positions, at an instantaneous set value of the angular position of the winding member of this screen, with this set value itself determined, using a profile that represents the desired instantaneous axial position for the load bar during a movement between its first and second positions, by using, for each screen, the one-to-one approximation function defined by the coefficients determined in step e3).

8. Electric actuator designed for the implementation of a method for controlling according to claim 7, within a screen comprising a flexible element supporting a load bar and a controlled member for winding the flexible element driven in rotation by the actuator, wherein it comprises means of controlling the actuator at the instantaneous set value of the angular position of the winding member.

9. Actuator according to claim 8, wherein it comprises means for calculating coefficients at the step e3); and the instantaneous value of the set value of the angular position at the step e6).

10. Actuator according to claim 8, wherein it is designed for the implementation of a method for controlling a group of screens configures by a method which comprises, after steps e1) to e3), steps consisting in e4) choosing a profile that is representative of the desired instantaneous axial position for the load bar of each screen during its movement between the first and second positions, e5) calculating, for each instant, during the movement of the load bar of each screen between the first and second positions, and by using the coefficients determined in the step e3), an instantaneous set value of the angular position of the winding member of which the image via the one-to-one function of this screen is equal to a value of the instantaneous axial position of the load bar corresponding to the profile chosen in the step e4), the actuator comprises means for selecting the profile chose in the step e4) from among a set of pre-established profiles.

11. Home automation installation comprising at least one screen provided with an actuator according to claim 8.

* * * * *